US010167856B2

(12) United States Patent
Yew (10) Patent No.: US 10,167,856 B2
(45) Date of Patent: Jan. 1, 2019

(54) UTILIZATION OF MOMENT OF INERTIA AND LEVER FOR MECHANICAL GAIN

(71) Applicant: Hong Cho Yew, Escondido, CA (US)

(72) Inventor: Hong Cho Yew, Escondido, CA (US)

( * ) Notice: Subject to any disclaimer, the term of this patent is extended or adjusted under 35 U.S.C. 154(b) by 0 days.

(21) Appl. No.: 15/846,093

(22) Filed: Dec. 18, 2017

(65) Prior Publication Data
US 2018/0298886 A1    Oct. 18, 2018

(51) Int. Cl.
| | | |
|---|---|---|
| *F04B 9/04* | (2006.01) | |
| *F16H 37/12* | (2006.01) | |
| *F15B 1/02* | (2006.01) | |
| *F16F 15/28* | (2006.01) | |
| *F15B 1/26* | (2006.01) | |
| *F04B 53/10* | (2006.01) | |

(52) U.S. Cl.
CPC .............. *F04B 9/047* (2013.01); *F15B 1/024* (2013.01); *F15B 1/26* (2013.01); *F16F 15/283* (2013.01); *F16H 37/124* (2013.01); *F04B 53/10* (2013.01)

(58) Field of Classification Search
CPC .. F04B 9/047; F04B 53/10; F15B 1/26; F15B 1/024; F16F 15/283; F16H 37/124
See application file for complete search history.

(56) References Cited

U.S. PATENT DOCUMENTS

| | | | | |
|---|---|---|---|---|
| 4,901,589 A | * | 2/1990 | Gaigl | B23Q 16/024 425/444 |
| 7,862,482 B1 | * | 1/2011 | Hsu | A63B 22/001 482/51 |
| 7,938,419 B2 | * | 5/2011 | Leslie | B62M 1/14 280/225 |
| 2011/0053731 A1 | * | 3/2011 | Greenwood | B62D 11/006 476/47 |
| 2015/0190292 A1 | * | 7/2015 | Robins | A61G 5/125 180/366 |
| 2018/0066741 A1 | * | 3/2018 | Luo | B62M 1/30 |
| 2018/0291895 A1 | * | 10/2018 | Afshari | F04B 9/105 |

FOREIGN PATENT DOCUMENTS

KR    10-2006-0103761    * 10/2006 ............... F03G 7/10

* cited by examiner

Primary Examiner — Michael C Zarroli

(57) ABSTRACT

This invention provides output gain by rotating a solid wheel from the center of mass as an input and connecting a lever to the edge of the same wheel at 180 degrees apart to each other. Each lever is connected at 180 degrees apart at the input rotating wheel with a common fulcrum located near the output side. This lever, acting as a mechanical lifting device, drives one side of output gain driven by the ratio of the length of lever to and from fulcrum between input and output while the other side is provided by another lever at 180 degrees apart.
A unidirectional rotor converts the lever motion of up and down to a rotational motion.
Weight of materials in a system is recycled back as an input to a hydraulic lever that generates hydraulic pressure driven by the movement of the system weight as it bounces off the surface.

6 Claims, 8 Drawing Sheets

Top view of the rotating wheels and levers with unidirectional output rotating rod and wheel Lever Connections to Vehicle Upper Wheel Well Figure 1. Simplified Block Diagram of Inventions Figure 2. Top view of the rotating wheels and levers Figure 3. Side view of rotating wheels and Levers Figure 4. Top view of the rotating wheels and levers with unidirectional output rotating rod and wheel Figure 5. Side view of mating wheel and levers for counter clockwise rotation at output side with unidirectional output rotating rod and wheel Figure 6. Lever with double action hydraulic pump Figure 7. Lever Connections to Vehicle Upper Wheel Well Figure 8. Lever Connections to Vehicle Lower Wheel Well

UTILIZATION OF MOMENT OF INERTIA AND LEVER FOR MECHANICAL GAIN

BACKGROUND AND DESCRIPTION OF THE INVENTION

1. Field of the Invention

Field of application is in load carrying machines where improvements can be made using rotational wheels, levers, unidirectional rod, and system weight.

Physical nature of a wheel held by a shaft at the center of the wheel allows less power to rotate while more power is provided at the edge of the wheel. This is based on moment of inertia and parallel axis theorem.

Common application of this is seen in flywheel applications. To increase the total power, more than one set of the wheels, levers, and rods can be installed since the added weight is not an issue when the entire system recycles its weight as an input to a hydraulic lever that generates pressure driven by the weight of the system in motion applied to the lever. For stationary systems recycling system weight may not be productive since the system weight in motion will be far less than the system weight in motion of a moving vehicle bouncing off the surface. Furthermore, system weight of a stationary system is not as critical as to a transportation system where the system weight itself is a load that has to be transported.

By utilizing solid wheels, levers, and rods, energy savings and improvements are achieved while the system weight is recycled as an energy source driving the lever of the hydraulic pump for transportation systems.

Current motor vehicles weigh several thousand pounds and the weight is dissipated or damped by different ways and means. This invention allows recycling the vehicle weight as energy source. There have been many different types of recycling the moving motion generated by the weight of the vehicle, but this one is based on using the vehicle weight to generate hydraulic pressure by means of a lever action.

The present invention is a force multiplier design by means of utilizing the moment of inertia from a rotating solid wheel and levers as well as recycling the system weight to drive hydraulic levers and pistons as the system weight moves up and down pumping the hydraulic fluid at each moving direction.

Physics of a rotating mass, the moment of inertia at the center of mass, the moment of inertia at the rim or edge, and a lever with fulcrum have been well known for hundreds of years. This invention utilizes the rotating mass principle by applying input power to the center of the rotating masses and then letting the both ends of the rotating wheel driving another rotating wheel at a distance via two connecting levers. This invention is based on the proven mathematical model that shows improvement of energy efficiency between the moment of inertia seen at the center of mass $I_{CM}$ and the moment of inertia seen at the edge or rim of the wheel $I_{RIM}$ as:

$I_{CM} = \frac{1}{2} MR^2$ and $I_{RIM} = \frac{3}{2}$ where M is the mass and R is the radius of wheel In addition to this moment of inertia provided by rotating wheels, the two levers also provide mechanical advantage driven by the ration of the length of lever to and from the fulcrum.

Utilization of system weight by means of using the system weight acting as an input to a hydraulic lever that pumps the hydraulic fluid as the lever moves is another way of improving the output efficiency.

This hydraulic lever captures the vertical movements of a wheel well where damping functions are needed. So, the vertical movements of each wheel well are driven by the stiffness of the shock and vibration absorbing design of the wheel well, and each lever at different locations will have different level of vertical movements.

Since this hydraulic pump is an integral part of the wheel well the hydraulic pressure level can be made adjustable for desired riding comfort levels as well as the desire to achieve different pressure levels in addition to the exiting design that comes with the wheel well. Each set pressure level must be maintained and only the pressure level above the set pressure level can be used.

Pressurized fluid is connected to a central accumulator to store excess energy and release it when needed.

FIGS. 2 through 5 illustrate how the rotational solid rods and connecting levers work.

Figure 6:
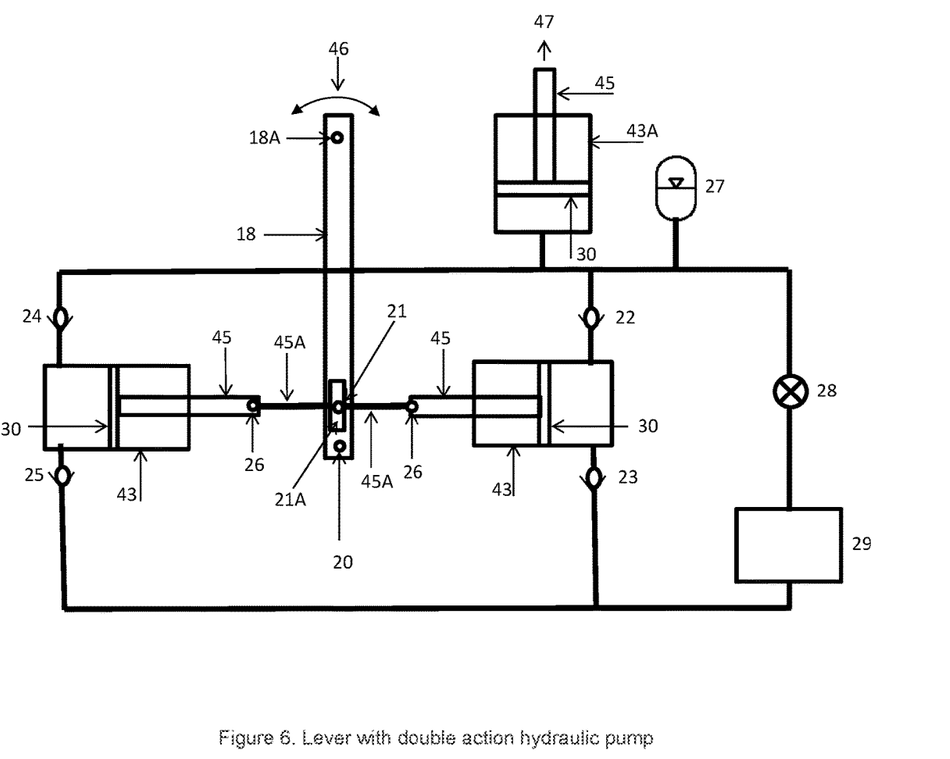
FIG. 6 shows a general view of lever with double action hydraulic pump.
Figure 7:
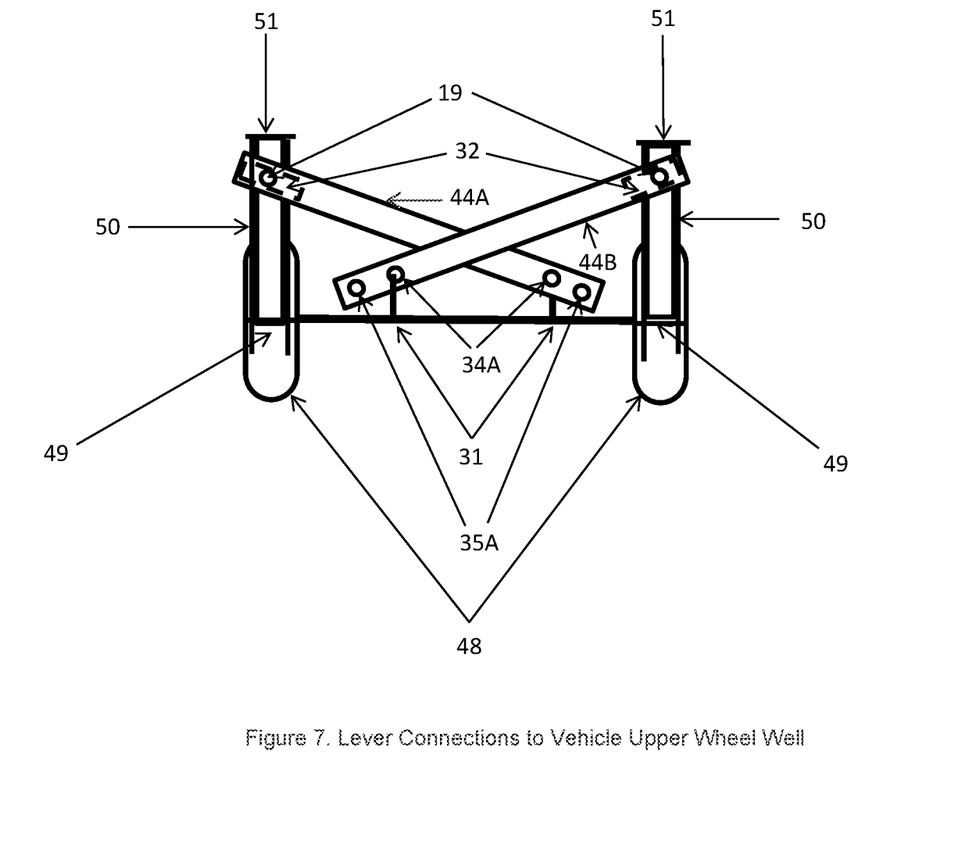
FIG. 7 shows a general view of lever connections to vehicle upper wheel well.
Figure 8:
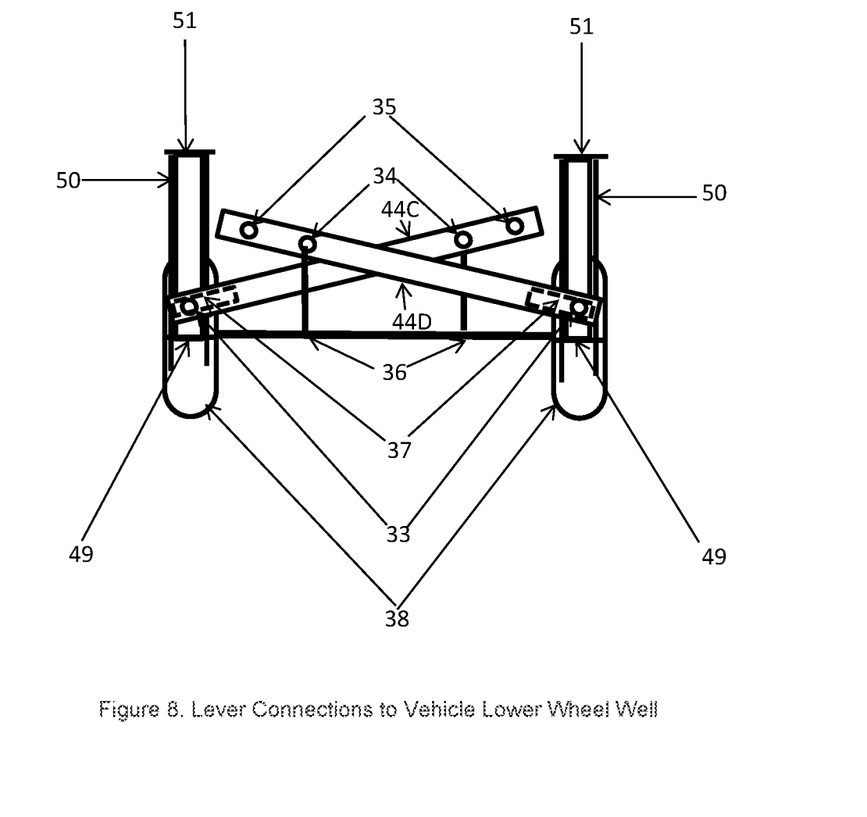
FIG. 8 shows a general view of lever connections to vehicle lower wheel well.

FIGS. 6 to 8 illustrate how the hydraulic system works.

1.1 ROTATING SOLID WHEEL AND LEVER

FIGS. 2 through 5 show block diagrams of a rotating solid wheel that has the moment of inertia as a function of mass and length. This is based on simple physics of moment of inertia of the solid wheel that is known as $$I_{CM} = \frac{1}{2} MR^2 \text{ and}$$

$$I_{RIM} = \frac{3}{2} MR^2 \text{ where}$$

$I_{CM}$ is moment of inertia at the center of mass, M is mass of the solid wheel, R is the length of the radius of solid wheel, and $I_{RIM}$ is the moment of inertia at the rim or edge of the solid wheel based on the parallel axis theorem.

Using this parallel axis theorem, $$I_{RIM} = I_{CM} + MR^2 = \frac{1}{2} MR^2 = MR^2 = I_{RIM} = \frac{3}{2} MR^2$$

Rotating solid disk like a flywheel provides $I_{CM} = \frac{1}{2} MR^2$ and $I_{RIM} = \frac{3}{2} MR^2$ with inertia gain at the rim.

This rotational solid wheel is connected to a unidirectional solid rod at a distance via two solid connecting levers in a crisscrossing way at 180 degrees apart at near ends of the both levers. This allows taking advantage of the mechanical lever known as the law of the lever.

As proven by Archimedes the law of lever shows that if the distance "a" from the fulcrum to where the applied input force "point A" is greater than the distance "b" from fulcrum to where the output force "point B" is generated, then the lever amplifies the input force. This invention takes advantage of the law of lever that offers mechanical advantage (MA) that is expressed as $$MA = Fo/Fi = a/b$$

$$Fi \times a = Fo \times b$$

where Fo=output force, Fi=input force, a=lever distance from input side to fulcrum, b=lever distance from output side to fulcrum.

Lever connected to the one end of solid wheel at the input side drives a unidirectional solid rod at the other end of the lever. Each lever is connected at 180 degrees apart at both ends. Since each end of the solid wheel at the input side is connected to a lever at 180 degrees apart, two levers drive the unidirectional solid rod at the output side as the levers move up and down causing a rotational motion. Direction of the rotational motion of this unidirectional solid rod is set by the shape of the rod since the levers move only up and down.

This invention takes advantage of the moment of inertia provided by the solid wheel at input side in addition to taking advantage of the lever actions.

By combining these two simple methodologies, greater energy savings and output improvements are achieved.

More than one set of this design can be installed as long as space is available in stationary system. For transportation systems the added weight is recycled as input to hydraulic levers which generate hydraulic pressure that is another part of this invention.

By coupling the rotating wheel and moving levers, substantial gain at the output is achieved based on the moment of inertia provided by the rotating wheel and the ratio of length of levers as described above.

Exact gain is driven by the efficiency of the design, materials used, material mass, and material length.

Figure 1:
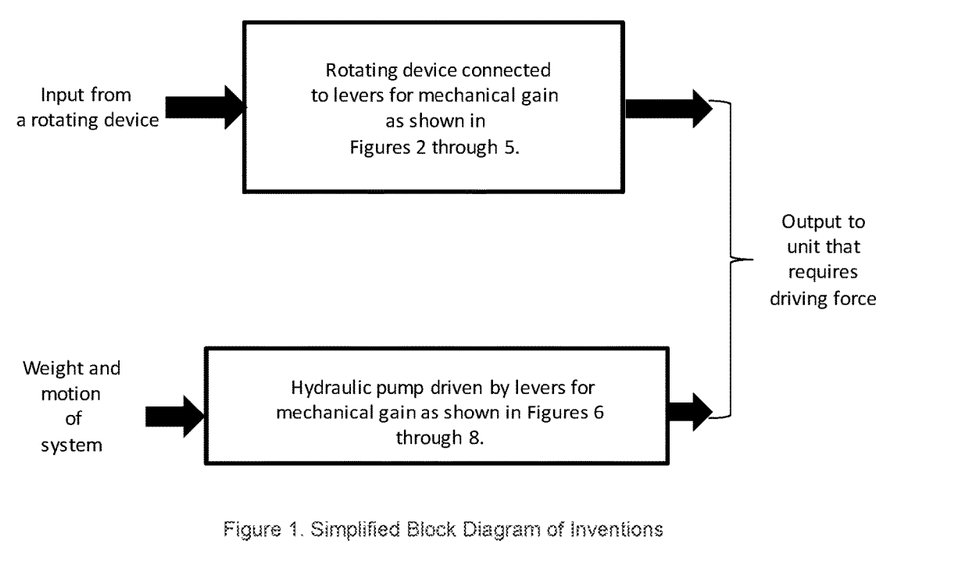
FIG. 1 shows a simplified block diagram of inventions in a major functional flow diagram formant identifying Figures related to the major functional block.
Figure 2:
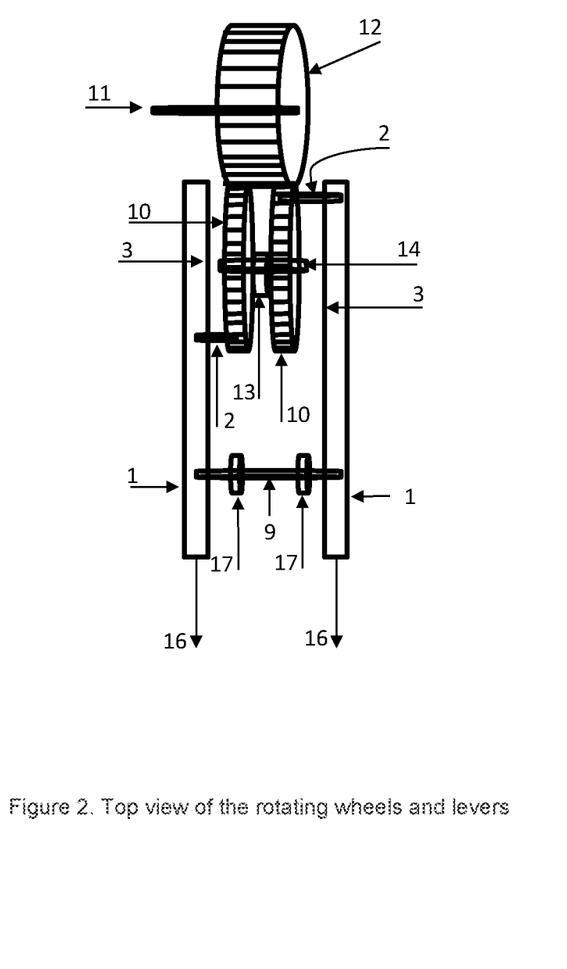
FIG. 2 shows a top view of the rotating wheels and levers.
Figure 3:
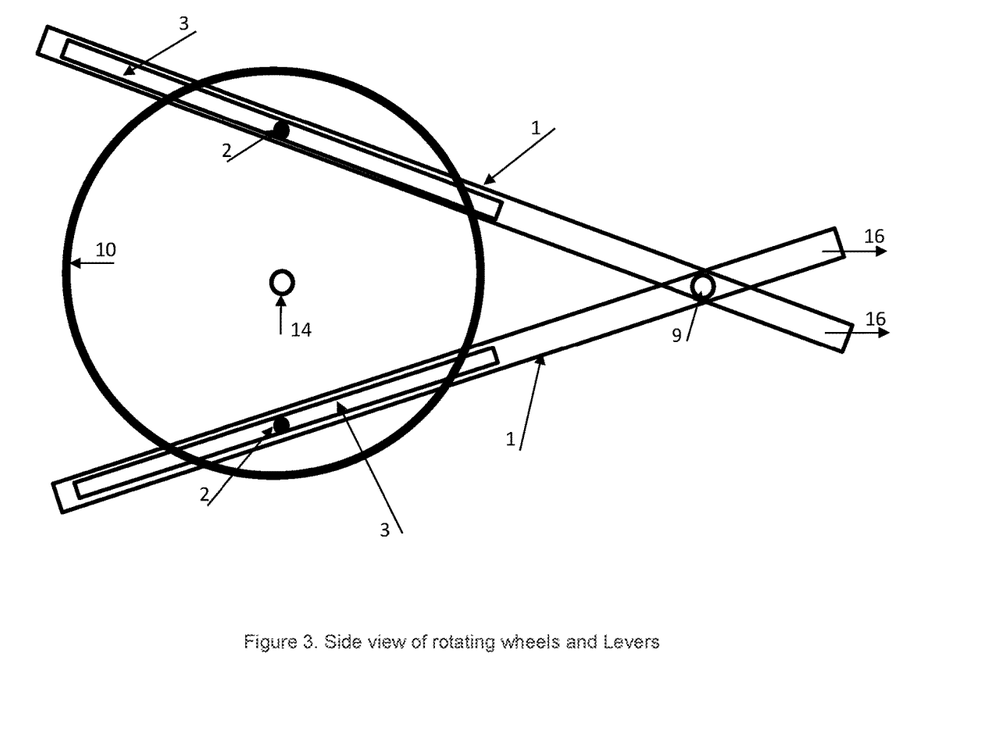
FIG. 3 shows a side view of rotating wheels and levers of FIG. 2.
Figure 4:
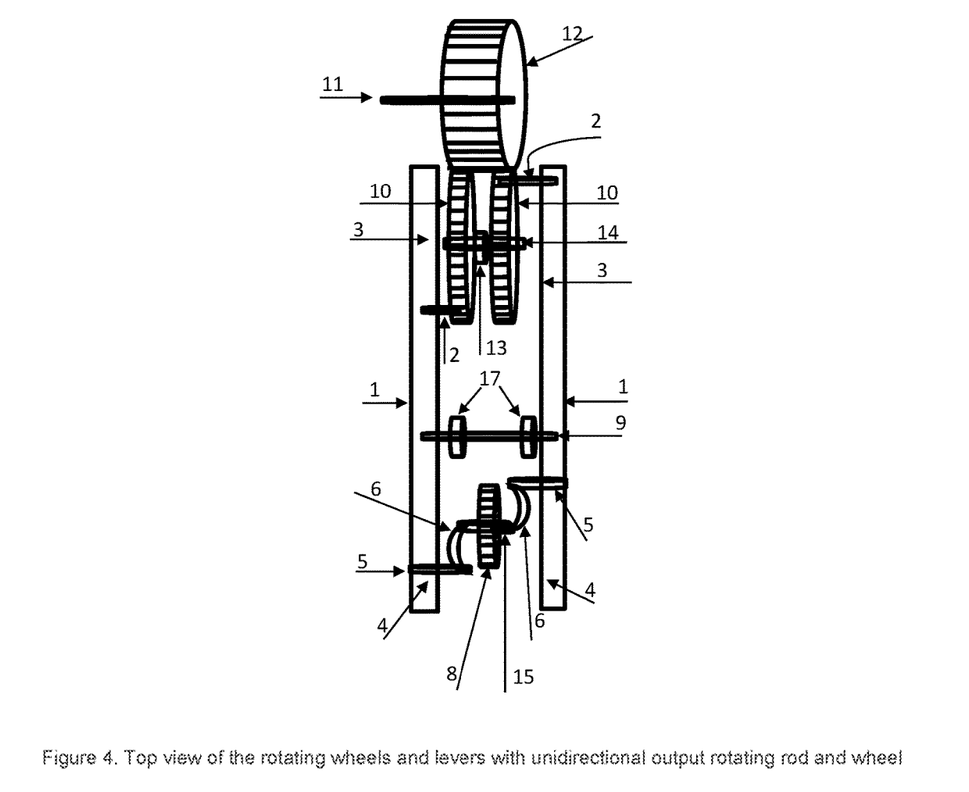
FIG. 4 shows a top view of the rotating wheels and levers with unidirectional output rotating rod and wheel. This FIG.
Figure 5:
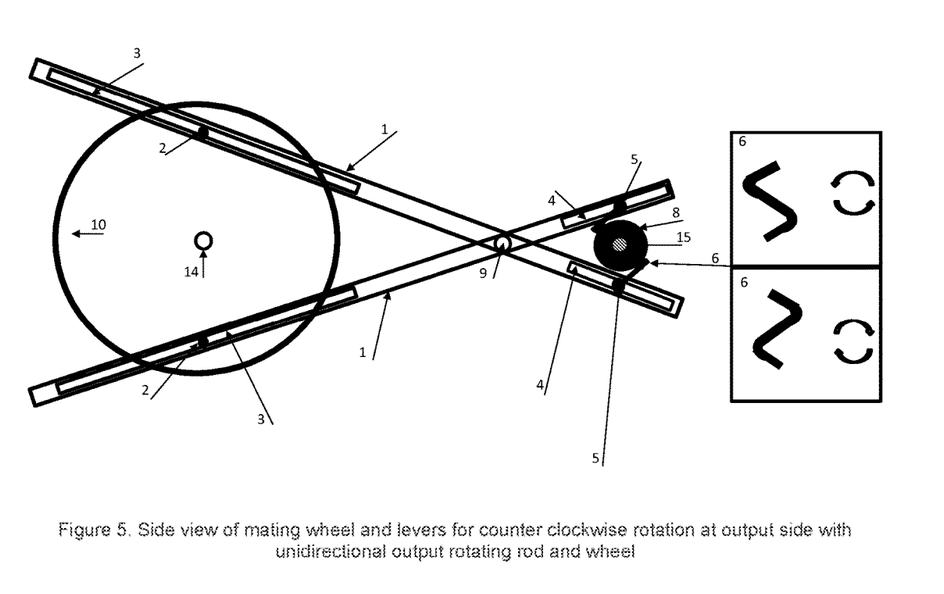
FIG. 5 shows a side view of mating wheel and levers for counter clockwise rotation at output side with unidirectional output rotating rod and wheel. This

FIGS. 2 and 3 are applicable where an output movement of up and down force is needed, such as hydraulic lever while FIGS. 4 through 5 are applicable where an output of rotational power is needed like generators, motors, vehicles, motor cycles, and bicycles.

FIGS. 2 through 8 utilize the following items and functions as the item numbers are called out in the figures:

1: Lever. This lever provides the mechanical gain driven by the ratio between the length to and from the fulcrum. Lever moves up and down independent of the rotational direction of the driving wheel.

2: Connecting point for lever and rotating wheel at 180 degrees apart. This separation at 180 degrees apart provides a scissor like function at the output using the fulcrum item No. 9.

3: Slotted area for lever movement at the input side. This slotted area provides lever to move up and down as the rotating wheel runs its circular path.

4: Slotted area for lever movement at the output side. This slotted area provides lever to move up and down while the output unidirectional rod connected to the lever runs its circular path.

5: Connecting point for unidirectional rod and lever at the output side.

6: Unidirectional rod at the output side. Substantially equivalent shape allows continuous rotation in one direction based on the force applied by the levers. Reverse direction is obtained by rotating the rod horizontally.

7: Center of mass at the output rotating wheel of item 8. Not shown in the figure for simplicity. For analytical purposes it is the same point where rim of center shaft for output wheel 15 is.

8: Rotating output wheel

9: Pivot point for lever and a fixed position. Acts as a fulcrum for lever.

10: Mating wheel at the input side

11: Input from a rotating source and center of mass of rotating solid wheel

12: Rotating wheel at input side. Rotation of this wheel moves the levers up and down independent of the rotational direction.

13: Support rod for the mating wheel at input side

14: Cross-pin for the mating wheel at input side

15: Center shaft for output wheel

16: Lever output

17: Supporting rod for the fulcrum

18: Lever

18A: Swivel connection point for lever. Each of the swivel connection point of item 35 and item 35A are individually connected to this item.

19: Connection point from lever to wheel well where damping of motion is required 20: Lever pivot point. Fixed position. Connected to frame and acts as fulcrum.

21: Swivel connection point at lever for double action hydraulic pump connecting rod.

21A: Slotted area for lever movements

22: Check Valve 1

23: Check Valve 2

24: Check Valve 3

25: Check Valve 4

26: Swivel connection point at piston rod

27: Accumulator for multi-units

28: Multi-position relief valve for different pressure relief levels

29: Reservoir for multi-units

30: Pumping piston

31: Vehicle axle frame vertical and horizontal

32: Slotted area for lever movements

33: Connection point from lever to wheel well where damping motion is required

34: Lever pivot point. Fixed position. Connected to axle frame and acts as fulcrum.

34A: Lever pivot point. Fixed position. Connected to axle frame and acts as fulcrum.

35: Swivel connection point at lever for double action hydraulic pump. Each of this point is connected to item 18A individually.

35A: Swivel connection point at lever for double action hydraulic pump. Each of this point is connected to item 18A individually.

36: Vehicle axle frame vertical and horizontal

37: Slotted area for lever movements

38: Cancelled, not used.

39: Cancelled, not used.

40: Cancelled, not used.

41: Cancelled, not used.

42: Cancelled, not used.

43: Cylinder

43A: Output release cylinder

44A: Lever 1

44B: Lever 2

44C; Lever 3

44D: Lever 4

45: Piston rod

45A: Connecting rod between piston rod and lever

46: Reciprocating input from vehicle weight bouncing off the surface

47: To load

48: Wheel

49: Bottom of wheel well

50: Wheel well support beam for free vertical motion and wheel angle adjustment

51: Top of wheel well 1.2 BRIEF DESCRIPTION OF FIGURES

4 has the same items shown in FIG. 2 plus additional items which provide functions of unidirectional rotating rod and wheel.

FIG. 5 is a side view of FIG. 4 with limited items shown for clarity.

1.3 DETAILED DESCRIPTION OF FIGURES

FIG. 2 shows item 11 that is providing a rotational force as the center of rotational force that drives the rotating wheel item 12. The edge of the item 12 is mated with two mating wheels of item 10 and each of the mating wheel has connecting point item 2 that is separated at 180 degrees apart between the two mating wheels which are supported by item 13 a fixed support rod. These two connecting points at 180 degrees apart drive the connected lever item 1 through the slotted area item 3 providing the up and down motions. These two levers of item 1 has a pivot point item 9 that acts as a fulcrum in a fixed position. At item 16 a mechanical gain is obtained based on the ratio of the distance between item 2 to item 9 and item 9 to item 16 where a load is to be connected. During one revolution of item 10, item 2 transitions from nearest to item 9 to the farthest to item 9 varying the mechanical gain from maximum to minimum at every half a cycle. Since each lever is connected at 180 degrees apart to each other, mechanical gain provided by each ever is at the opposite to each other.

FIG. 3 shows another view of FIG. 2 looking from the side. Parts shown are limited to main parts for clarity.

FIG. 4 is an extension of FIG. 2 by adding a rotating device at the end of the levers so that a rotational force is provided as an output instead of providing an up and down motion shown in FIG. 2.

FIG. 5 is another view of FIG. 4 looking from the side. Parts shown are limited to main parts for clarity.

FIG. 6 shows how a lever with double action drives hydraulic pumps.

As shown in FIG. 6, the reciprocating lever pumps pistons into unidirectional flow in the load cylinder. When the ever moves to the left, Check Valve 1 item 22 opens, allowing the pressurized fluid to move into the load. The same motion makes Check Valve 4 item 25 to open, due to the partial vacuum created by the expanding cylinder chamber, filling the left-side cylinder with unpressurized fluid from the reservoir. So, the cycle continues as lever is in reciprocating motion. Each lever is connected to each lever connecting point in FIG. 7 item 35 and item 35A. However, reservoir, accumulator, and output release cylinder are common items which are connected to individual double action hydraulic pumps.

FIGS. 7 and 8 show lever connections for upper wheel well and lower wheel well, respectively.

Slotted area item 32 and item 37 at the lever where it is connected to capture vertical movement allows the lever to move up and down as the weight of the system as well as wheels bounce up and down. This movement at the slotted area is transmitted to the other end of the lever supported by a fulcrum item 34 and item 34A. This allows continuous generation of hydraulic power as the system bounces up and down. Moving vehicles and trains have gross vehicle and cargo weight bouncing up and down as they roll on the surface providing input to this invention.

A hydraulic motor that converts this hydraulic pressure into mechanical force to drive work load. For this application, hydraulic circuits, pumps and motors are designed to form a hydraulic-powered force and transmission. A pump, which is mechanically linked to a prime mover, draws fluid from a reservoir and forces it to a motor. A motor, which is mechanically linked to the workload, is actuated by this force so that motion or torque, or both, are conveyed to the work.

Field of application is in load carrying machines where moving motions are present and where such motions need to be dissipated.

Any weight or load pushing down onto the surface is captured and used as energy source using the levers to move the hydraulic pumps. This becomes more dynamic when it is in moving motion. Regeneration of power occurs when the lever movement is directed to the pump to move the load.

Areas where the levers are installed are where the most vehicle weight is pushing down to the surface, such as, axles, wheel wells, motor mounts, and swivel control arms. Conventional wheel wells and axles typically have shock observer, coil spring, or leaf springs.

Based on lever principle, vehicle weight connected at one end of a lever and hydraulic pumps connected at the other end of lever is the basic idea of this invention. The moving motion applied to levers which drive hydraulic pumps in both directions becomes the energy source accumulated by the hydraulic pressure.

2. SUMMARY OF THE INVENTION

The present invention provides a power utilizing moment of inertia from the rotating solid wheels, levers, rods, system weight driving hydraulic pump and motor.

Possible modifications may be made by adding more rotating solid rods, levers, or wheels, and mechanically isolating the existing pump/motor or by rearranging pump/motors and other components.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It will be appreciated that although the embodiments described herein relate to transporting load applications, the disclosed invention is applicable to many other types of stationary system where up down power or rotational power drives loads. For non-transporting applications, like stationary machines and ground fixed machines, the rotating solid wheels, bars, and the connecting levers improve energy efficiency. But the hydraulic pump driven by the weight of the working system may not provide much since the system is NOT moving and being stationary, and the only dependable source motion is the shock and vibration.

I claim:
1. Apparatus for a single system of utilization of mechanical gain comprising:
   A type of teeth grooved rotating wheel driven by a center drive shaft;

two of a type of teeth grooved mating wheel driven by said rotating wheel;

a cross-pin that acts as a center of rotational axis for said two mating wheels as well as a connection point for support rod for said two mating wheels;

a pivoting connection point near the edge of each said mating wheel separated by 180 degrees apart from each of said mating wheel;

a lever that is connected to said edge of said each mating wheel at the pivoting connection point separated by said 180 degrees apart;

each of said lever having a slotted area for said pivoting connection point at the input side of a fulcrum allowing each said lever to move up and down;

a pivoting point for said two of said lever said near the end of said levers acting as a fulcrum as well as a support point for said levers and load; and a support rod connected to said support pin of said fulcrum.

2. Apparatus of claim 1 for converting up and down motion to a rotary motion further comprising:

a unidirectional rod at the output side of the fulcrum made to rotate in one direction as said levers move up and down at the said output side;

said output rod made to rotate in other direction by installing said output rod by turning it 180 degrees horizontally;

a type of teeth grooved output wheel mated to said output rod;

a pivoting connection point for said output rod and said lever on each side of said output wheel at 180 degrees apart;

said output rod connected to said lever on each side of said output wheel; a pivoting center cross-pin for said output wheel; and a supporting rod that connects to said cross pin for structural support.

3. Apparatus of claim 1 may be configured in a multi-system in either series or in parallel.

4. Apparatus of utilizing a system weight and motion as an input to a hydraulic pump lever for hydraulic pressure as a driving source is comprised of:

a Lever 1 connecting between the top of wheel well on left side and near the bottom of wheel well on the right side supported by a vertical frame and driven by system weight;

a Lever 2 connecting between the top of wheel well on right side and near the bottom of wheel well on the left side supported by a vertical frame and driven by said system weight;

a Lever 3 connecting between said bottom of wheel well on left side to near said top of wheel well on the right side and driven by said system weight;

a Lever 4 connecting between said bottom of wheel well on right side to near said top of wheel well on the left side and driven by said system weight;

each of said lever has slotted area at connecting point at said wheel well where said lever is connected, wherein said slotted area allows said lever to move up and down as said wheel well moves up and down;

each of the end of said lever 1, said lever 2, said lever 3, and said lever 4 has said connecting point acting as fulcrum;

said fulcrum is supported by said vehicle axle frame vertical and horizontal for said lever 1, said lever 2, said lever 3, and said lever 4;

said connecting point from each said lever at each end of said lever for hydraulic pump lever individually connected to swivel connection point at said lever 1, said lever 2, said lever 3, and said lever 4.

5. Apparatus of claim 4 wherein said hydraulic pump that generates and stores hydraulic pressure is further comprised of:

a reciprocating lever that moves bidirectional way connected to and driven by one of said system weight;

a swivel lever connection point at near the top of said reciprocating lever connected to one of said system weight;

a connecting rod attached to said reciprocating lever near the bottom but before fulcrum on each side for bidirectional movements;

a pumping piston on each side for bidirectional pressure generation; each said pumping piston with Check Valve before and after;

said reciprocating lever with slotted area for lever movement in both directions where said connecting rod is attached;

a fixed position acting as a fulcrum for said reciprocating lever;

a swivel connection point at both ends of each piston rod;

an accumulator for excessive pressure storage and use when needed;

a multi-position relief valve for different pressure relief levels;

a reservoir; and an output line that is connected to a hydraulic motor.

6. Apparatus of claim 4 may be configured in a multi-hydraulic pump system that generates and stores hydraulic pressure and is further comprised of: a multi-reciprocating lever and only one set of said accumulator, said reservoir, and said output release cylinder which are common parts for multi-reciprocating lever operations.

* * * * *

UNITED STATES PATENT AND TRADEMARK OFFICE
CERTIFICATE OF CORRECTION

PATENT NO. : 10,167,856 B2
APPLICATION NO. : 15/846093
DATED : January 1, 2019
INVENTOR(S) : Hong Yew Page 1 of 1

It is certified that error appears in the above-identified patent and that said Letters Patent is hereby corrected as shown below:

In the Specification

Column 2, Line 36 should appear as follows:
$I_{RIM} = I_{CM} + MR^2 = \frac{1}{2} MR^2 + MR^2 = I_{RIM} = \frac{3}{2} MR^2$ Signed and Sealed this
Twenty-sixth Day of February, 2019

Andrei Iancu
*Director of the United States Patent and Trademark Office*